(12) United States Patent
Willinger

(10) Patent No.: US 7,628,913 B2
(45) Date of Patent: Dec. 8, 2009

(54) AQUARIUM FILTER CARTRIDGE AND FILTRATION SYSTEM

(75) Inventor: Jonathan Willinger, Tenafly, NJ (US)

(73) Assignee: J.W. Pet Company, Inc., Teterboro, NJ (US)

( * ) Notice: Subject to any disclaimer, the term of this patent is extended or adjusted under 35 U.S.C. 154(b) by 7 days.

(21) Appl. No.: 12/013,919

(22) Filed: Jan. 14, 2008

(65) Prior Publication Data

US 2008/0210612 A1 Sep. 4, 2008

Related U.S. Application Data

(63) Continuation-in-part of application No. 11/243,912, filed on Oct. 5, 2005, now Pat. No. 7,429,321.

(51) Int. Cl.
| | |
|---|---|
| A01K 63/04 | (2006.01) |
| B01D 35/027 | (2006.01) |
| B01D 27/00 | (2006.01) |
| B01D 29/56 | (2006.01) |

(52) U.S. Cl. .................. 210/167.27; 210/336; 210/489; 119/259

(58) Field of Classification Search ............ 210/167.22, 210/167.25, 167.27, 336, 489; 119/259, 119/260
See application file for complete search history.

(56) References Cited

U.S. PATENT DOCUMENTS

| | | | |
|---|---|---|---|
| 526,695 A | 10/1894 | Emery | |
| 2,087,442 A | 7/1937 | Nack | |
| 2,100,951 A | 11/1937 | Glass, et al. | |
| 2,275,428 A | 3/1942 | Haldeman | |
| 2,359,985 A | 10/1944 | Gordon | |
| 2,369,915 A | 2/1945 | Quinn | |
| 2,605,901 A | 8/1952 | Morrison, et al. | |
| 2,652,151 A | 9/1953 | Legus | |
| 3,300,047 A | 1/1967 | Hirsch | |
| 3,513,978 A | 5/1970 | Newsteder | |
| 3,715,035 A | 2/1973 | Teeple, Jr. et al. | |
| 3,723,304 A | 3/1973 | Storck | |
| 4,303,521 A | 12/1981 | Lehmann | |
| 4,392,953 A * | 7/1983 | Cornelius et al. | 210/167.27 |
| 4,483,769 A | 11/1984 | Sherman | |
| 4,512,885 A | 4/1985 | Willinger | |
| 4,713,173 A | 12/1987 | Goldman et al. | |

(Continued)

FOREIGN PATENT DOCUMENTS

CH 621614 2/1981

(Continued)

OTHER PUBLICATIONS

Second Office Action with translation dated Jun. 26, 2009, from corresponding Chinese Application 200610007349.3.

*Primary Examiner*—Fred Prince
(74) *Attorney, Agent, or Firm*—Katten Muchin Rosenman LLP

(57) ABSTRACT

An aquarium filter cartridge including activated carbon or the like and a housing wherein the water traces an S-shaped path is disclosed. In the S-shaped path the water flows horizontally through a floss type filter, downward to the bottom of the housing, horizontally into the bottom of the carbon cartridge, up through the carbon filter, and out the top or upper side of the housing back into the aquarium.

8 Claims, 12 Drawing Sheets

U.S. PATENT DOCUMENTS

| | | | |
|---|---|---|---|
| 4,783,258 A | 11/1988 | Willinger et al. |
| 4,906,381 A | 3/1990 | Barbaro |
| 5,002,660 A | 3/1991 | Sherman et al. |
| 5,248,415 A | 9/1993 | Masuda et al. |
| 5,290,436 A | 3/1994 | Danner |
| 5,322,622 A | 6/1994 | Chiang |
| 5,423,978 A | 6/1995 | Snyder et al. |
| 5,522,987 A | 6/1996 | Bresolin |
| 5,618,419 A | 4/1997 | Fuerst et al. |
| 5,632,887 A | 5/1997 | Gargas et al. |
| 5,861,093 A | 1/1999 | Bennett |
| 6,210,567 B1 | 4/2001 | Takada |
| 6,224,766 B1 | 5/2001 | Yamato et al. |
| 6,797,163 B2 | 9/2004 | Carley et al. |
| 6,843,909 B1 | 1/2005 | Woltmann |
| 7,087,158 B2 | 8/2006 | Miyamoto et al. |
| 7,208,084 B2 | 4/2007 | Axelrod |
| 2004/0050759 A1 | 3/2004 | Ogawa |
| 2004/0094470 A1 | 5/2004 | Jackson |

FOREIGN PATENT DOCUMENTS

| | | |
|---|---|---|
| CN | 1582649 | 2/2005 |
| JP | 2003-200183 | 7/2003 |

\* cited by examiner

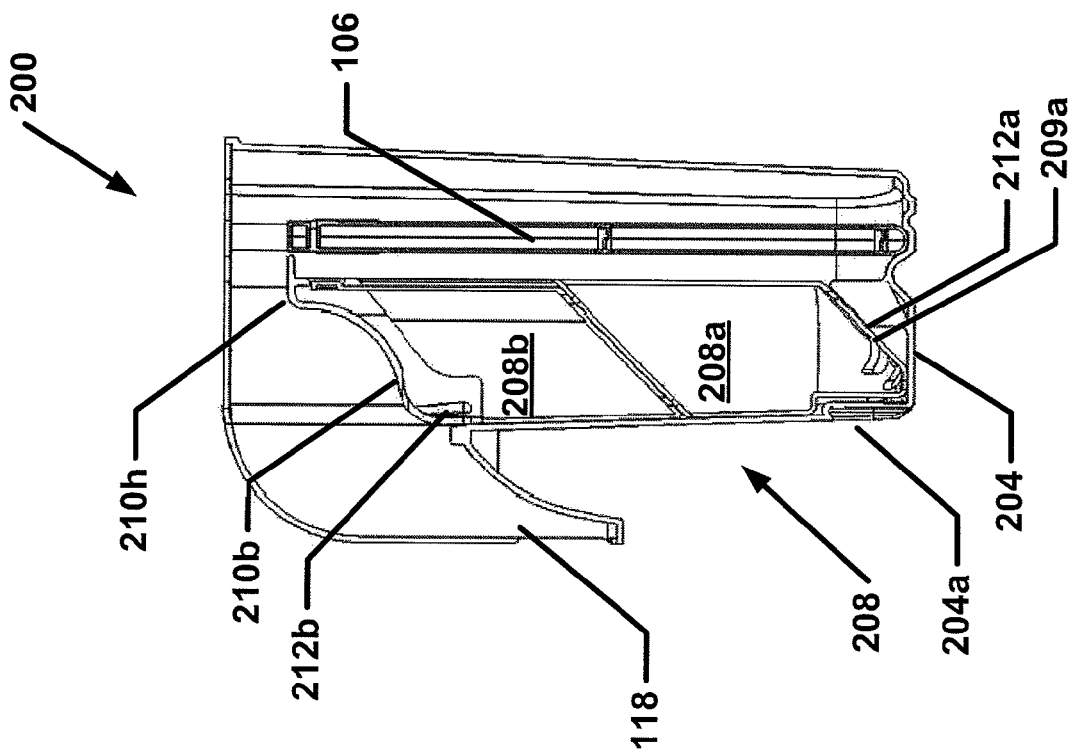
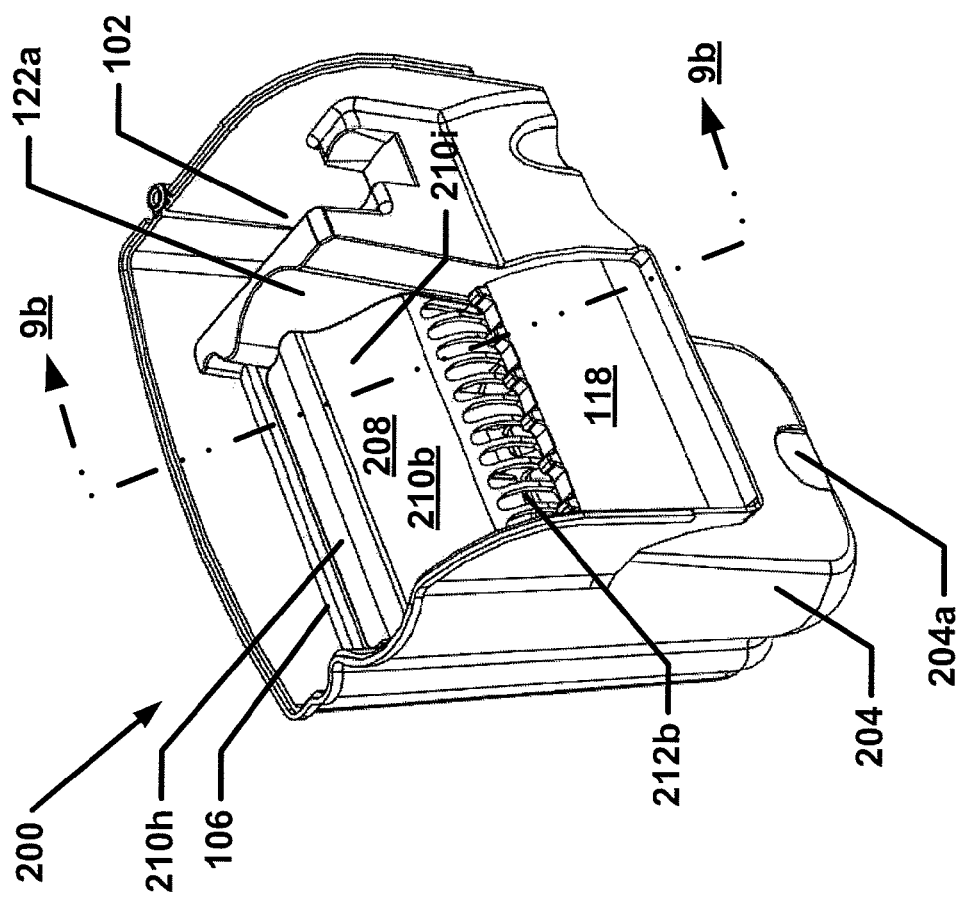
FIG. 9b
FIG. 9a

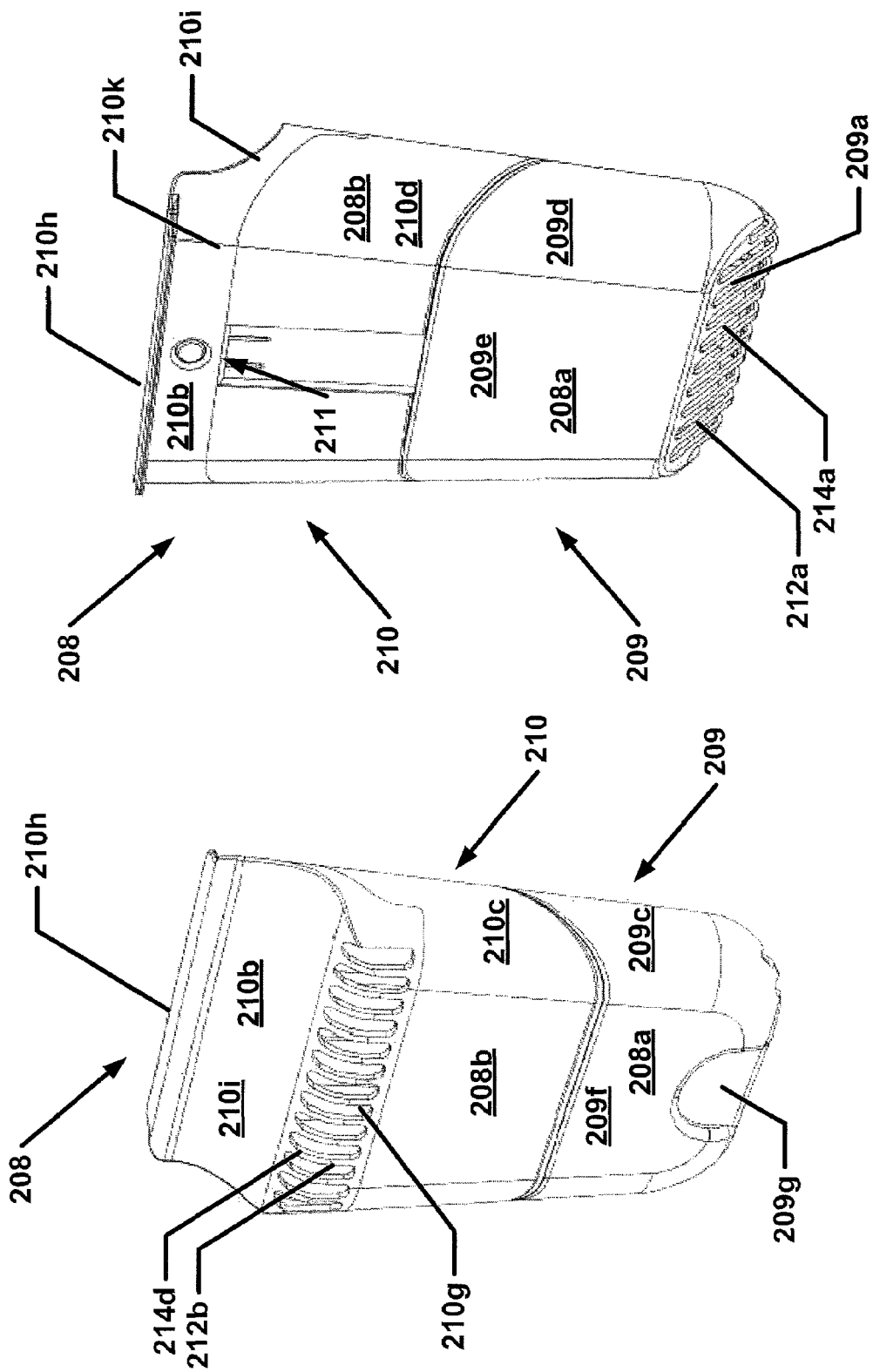

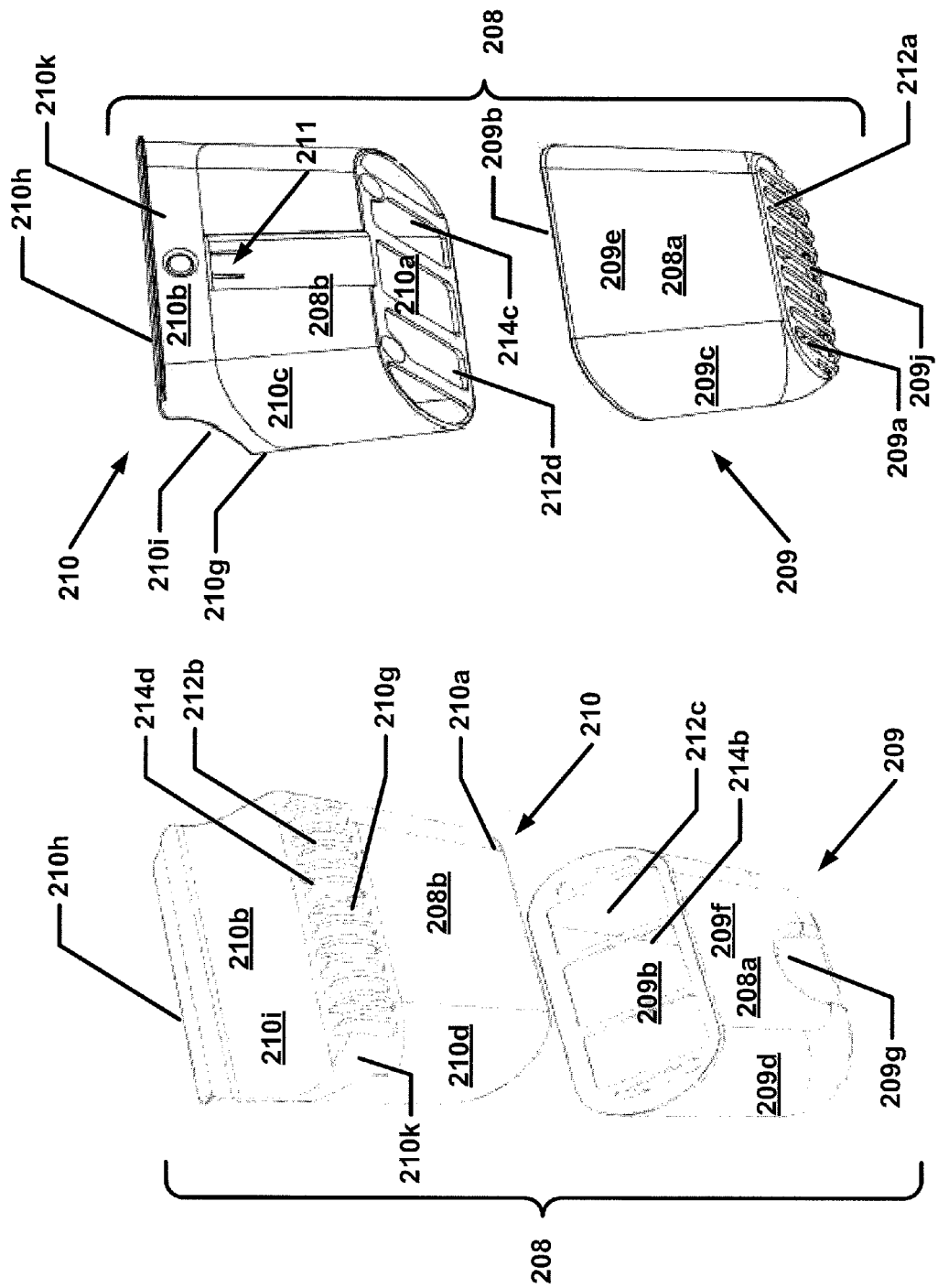

AQUARIUM FILTER CARTRIDGE AND FILTRATION SYSTEM

CROSS-REFERENCE TO RELATED APPLICATIONS

This application is a continuation-in-part of and claims priority to U.S. Ser. No. 11/243,912, filed Oct. 5, 2005, now U.S. Pat. No. 7,429,321, and which is incorporated by reference in its entirety herein for all purposes.

BACKGROUND OF THE INVENTION

1. Field of the Invention

The present invention relates to aquarium filtration systems, and more particularly to external aquarium filtration systems with a removable filter cartridges.

2. Background

External aquarium filters pull water from the aquarium tank and pass the water through various physical, chemical, and biological filters. Mechanical filtering typically uses a floss material or the like to screen and remove solid waste material and debris. Chemical filtration reduces ammonia levels using carbon (charcoal) or zeolite. Biological filtration reduces harmful levels of undesirable bacteria using thermoplastic tubules for aerobic bacterial growth. These filtration systems and biological filtration in particular, are improved by increasing the amount of time the water remains in contact with the filtration medium. This time is referred to as "dwell time."

Conventional filters that use removable/disposable filter cartridges, such as that available with the commercially available Whisper Power Filter or the Marineland Penguin Filter, typically are only able to put the water to be cleaned through a relatively thin layer of cartridge with carbon held within the cartridge. The amount of dwell time of the water within the cartridge in contact with the filter material is therefore limited. In contrast, the AquaClear filter manufactured by the Hagen Corporation, which does not use cartridges, brings water to be filtered from the bottom of the filter through a sponge layer and then through a bag of carbon or other filter material. The water rises up from the bottom of the filter and, under pressure, overflows back into the tank. While this design advantageously increases dwell time, it does so at the expense of the user's convenience. Compared with cartridge filters, this design requires substantial more time and inconvenience to change filter material.

A need, therefore, exists for a filtration system that both provides the convenience of a disposable cartridge filtration system and the improved performance of a system that has an improved dwell time.

SUMMARY OF THE INVENTION

An aquarium filtration system configured in accordance with the present invention successfully addresses these needs. In some embodiments of the invention, a removable filter cartridge for cleaning aquarium water in an external-type aquarium filter system is provided. The system includes a canister and a spillway. The filter cartridge includes a housing having a first and a second spaced-apart walls, an entrance at a lower portion of the first wall, the entrance having a lowermost portion and an uppermost portion, the lowermost portion being disposed substantially at a bottom of the canister, an exit at an upper portion of the second wall, the exit having a lowermost portion and an uppermost portion, the lowermost portion of the exit being substantially level with the spillway, and a filtration medium for providing filtration functions for the aquarium water, the filtration medium disposed in a space defined between the first wall and the second wall. Therein, the water follows a substantially S-shaped path between entering the filter cartridge from the canister and exiting the filter cartridge to the spillway.

These and other features and aspects of the present invention will be better understood with reference to the following description of exemplary embodiments, drawing, and the appended claims.

BRIEF DESCRIPTION OF THE DRAWINGS

FIG. 9a is a perspective view of an aquarium filtration system in accordance with one or more embodiments of the present invention.

FIG. 9b is a cross-sectional view of the aquarium filtration system of FIG. 9a.

FIGS. 10a and 10b are perspective views of a filter cartridge in accordance with one or more embodiments of the present invention.

FIGS. 10d and 10e are perspective views of the filter cartridge of FIGS. 10a and 10b, wherein the filter cartridge is shown in a separated status.

DETAILED DESCRIPTION

Figure 1:
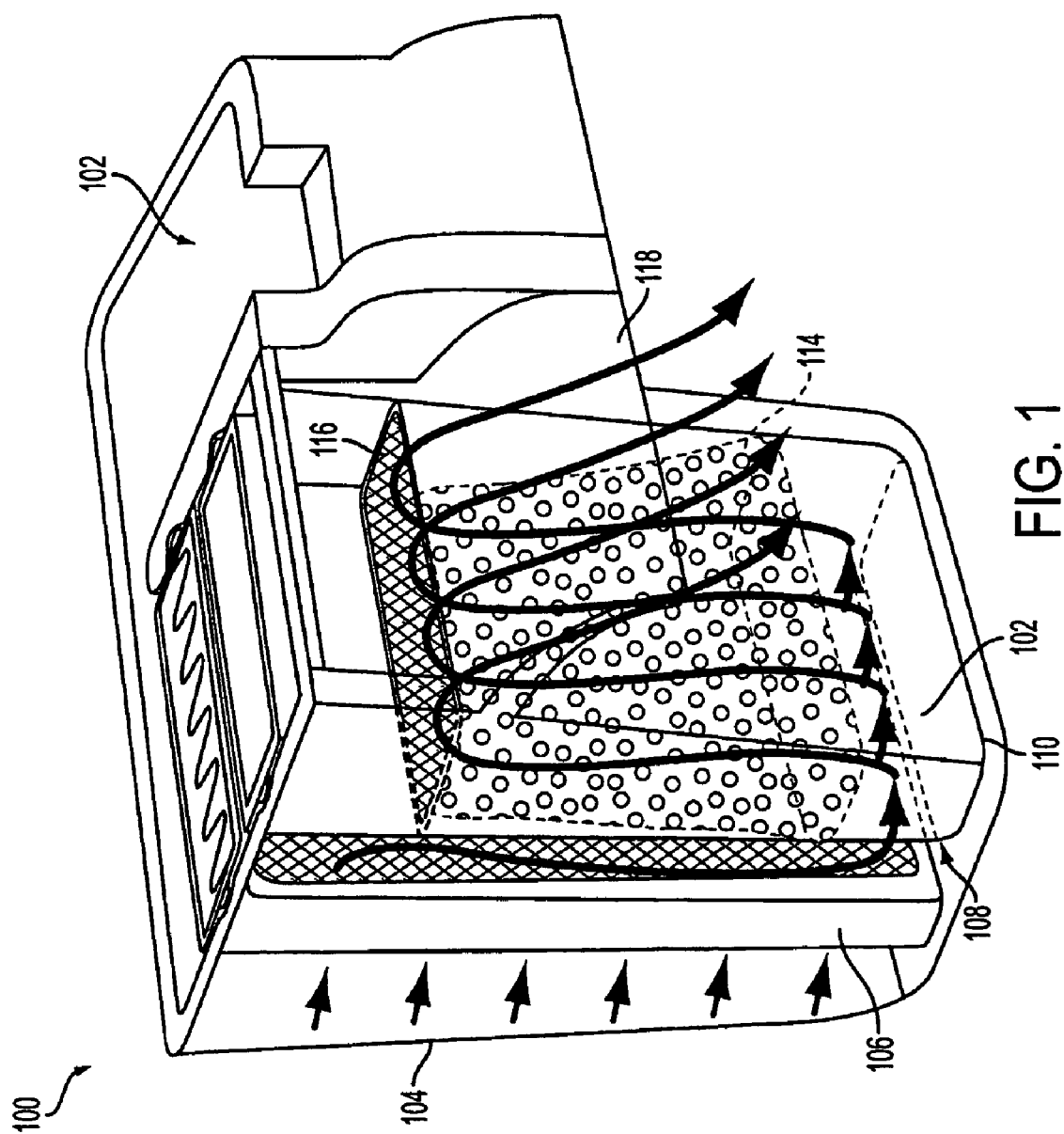
FIG. 1 illustrates a perspective view of an example aquarium filtration system according to embodiments of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices.

The present invention provides an aquarium filtration assembly that includes removable filter elements. A first mechanical screen including floss precedes a cartridge which provides chemical and biological filtration. Thus, the user of the present invention is provided with two easily accessed, disposed of, and/or replaced filtration elements.

Figure 2:
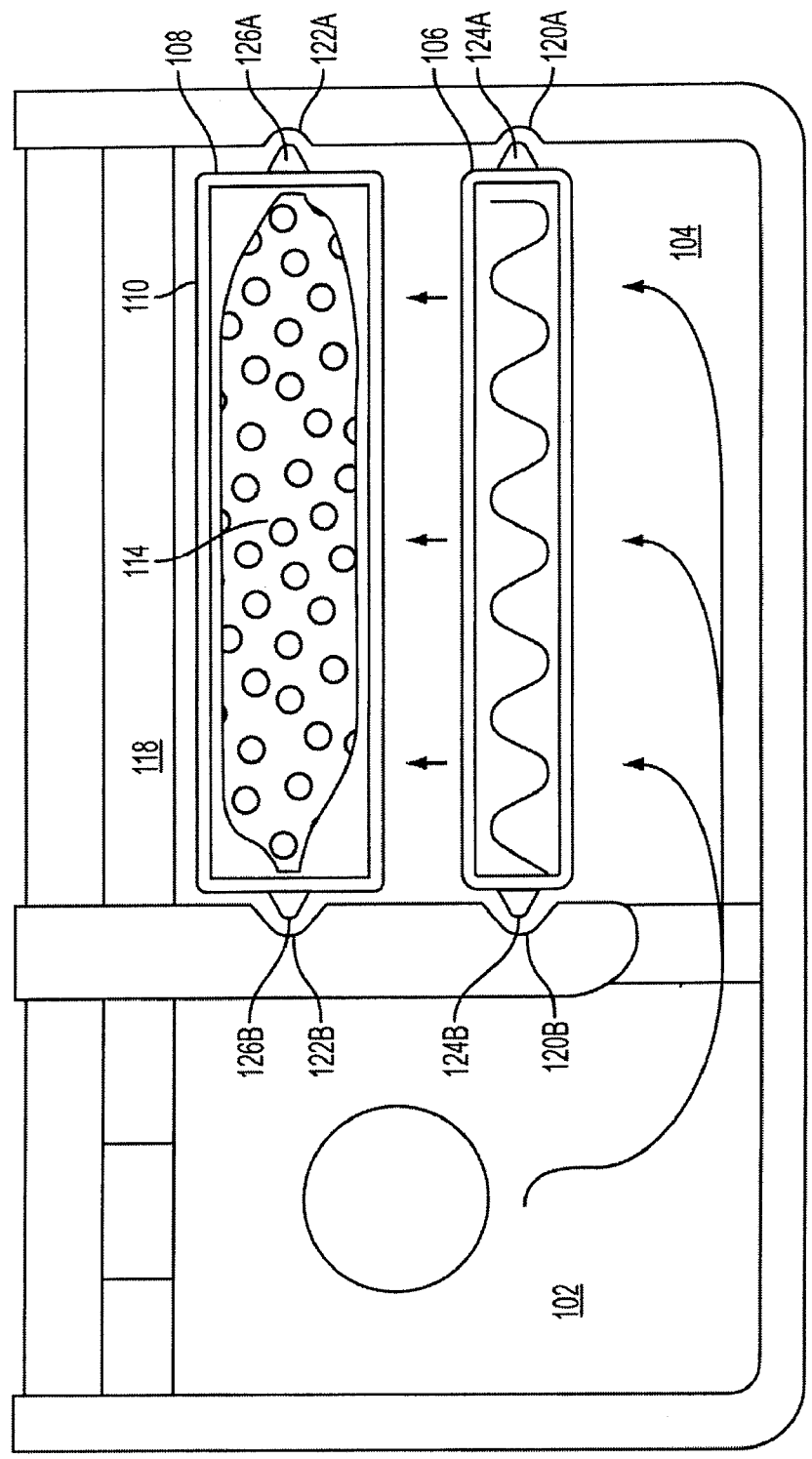
FIG. 2 illustrates a top plan view of the example aquarium filtration system illustrated in FIG. 1.
Figure 3:
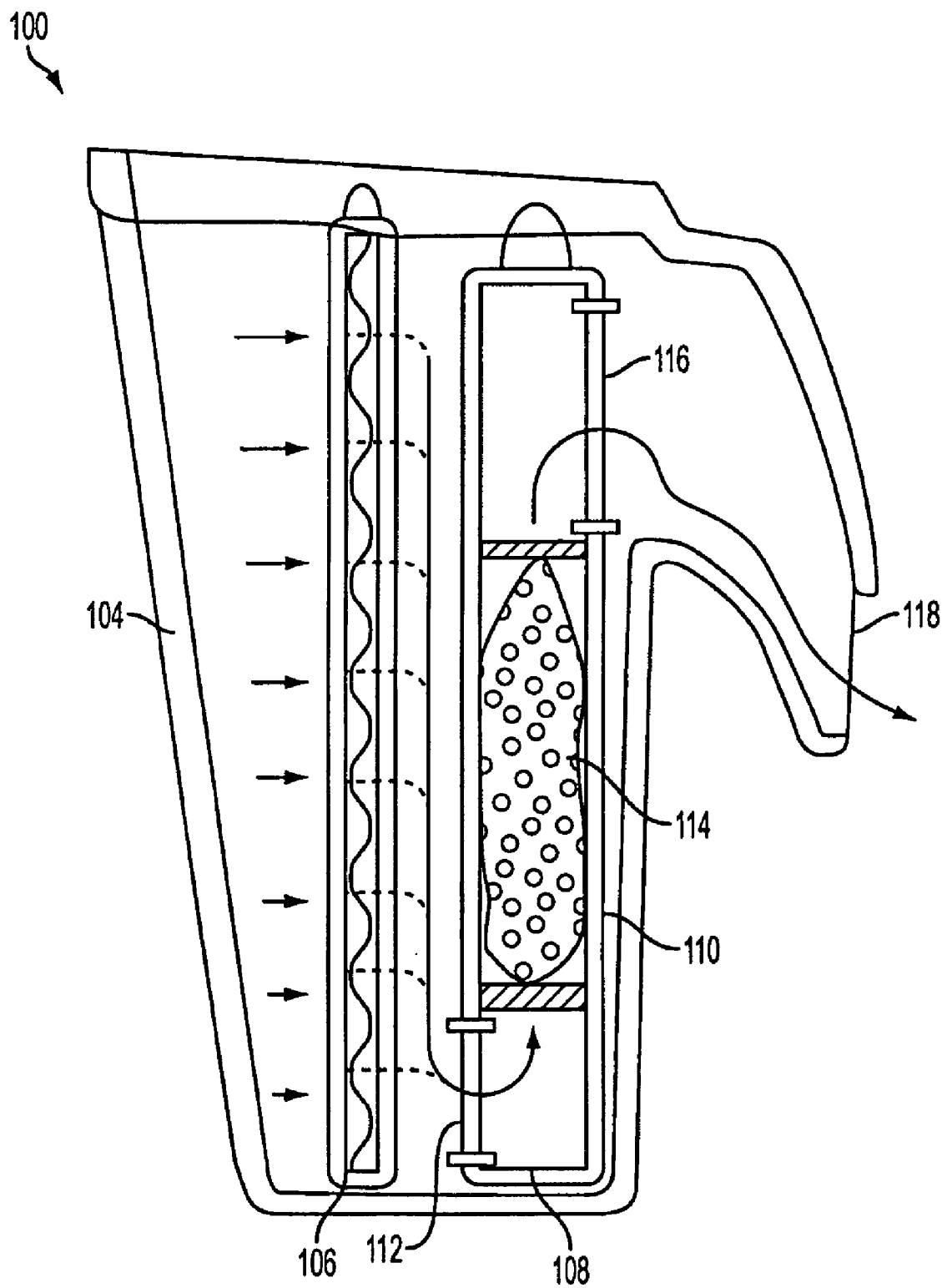
FIG. 3 illustrates a side plan view of the example aquarium filtration system illustrated in FIG. 1.

Turning now to FIGS. 1 through 3, perspective, top, and side views, respectively, of an example embodiment of an inventive filtration assembly 100 of an aquarium filtration system are depicted. Although not shown, the sidewall of an aquarium supports the filtration assembly 100, most of which is adapted to hang external to the aquarium. The filtration assembly 100 includes a water intake chamber 102 that receives unfiltered aquarium water from a pump (e.g., an impeller) (not shown). The water intake chamber 102 is in fluid communication with a canister 104 that is adapted to laterally support a removable panel screening filter 106 and a removable filter cartridge 108. After passing through the panel screening filter 106, water enters the housing 110 of the filter cartridge 108 via the lower entrance 112, passes through a filtration medium 114, and exits the filter cartridge 108 via the upper exit 116. Filtered water leaves the cartridge via exit 116 is then returned to the aquarium via a spillway 118.

Note that the flow of water is represented in FIGS. 1 through 3 by arrows. It can be seen in FIG. 3 that the path of water being filtered by the filter cartridge 108 has an S-shape between entering the filter cartridge 108 from the canister 104 and exiting the filter cartridge 108 to the spillway 118. In total, water flows horizontally through the panel screening filter 106 (e.g., a floss type filter), downward to the bottom of the housing 110, horizontally into the bottom of the filter cartridge 108 (e.g., a carbon cartridge), up through the filtration medium 114 (e.g., a carbon filter), and out the top to the spillway 118.

The advantage of this S-shaped water path is that it is longer than the water paths known in the art. The present invention advantageously increases the amount of "dwell time" the water is in contact with the filtration medium 114 and at the same time provides a convenient disposable cartridge-based filter that is easy to access, replace, and/or clean. It is an additional advantage of the present invention that biological filtration is greatly facilitated by a longer water path with greater dwell time. It is a further advantage that the cartridge comprises an entrance and an exit situated to take maximum advantage of fluid dynamics present in the canister so as to optimize the filtration pump and/or power being consumed.

In some embodiments, the filtration assembly 100 of the present invention may be molded from light weight plastic. A clear plastic may be preferred to better facilitate cleaning the filtration assembly 100 or to allow a user to more easily determine the need to clean or replace the filtration medium 114. As can be seen in FIG. 2, the canister 104 may include support grooves 120A, 120B, 122A, 122B to receive tabs 124A, 124B, 126A, 126B of the panel screening filter 106 and the filter cartridge 108, respectively.

In some embodiments, additional grooves may be included to provide lateral support for additional filter stages. In alternative embodiments, the panel screening filter 106 and the filter cartridge 108 may include a mechanism to allow them to be coupled together and thus, provide support to each other and/or only use one pair of support grooves.

In some embodiments, both the panel screening filter 106 and the filter cartridge 108 may be parts of one assembly that can be disposed of as one unit or serviced with a new floss and/or new charcoal.

Figure 4:
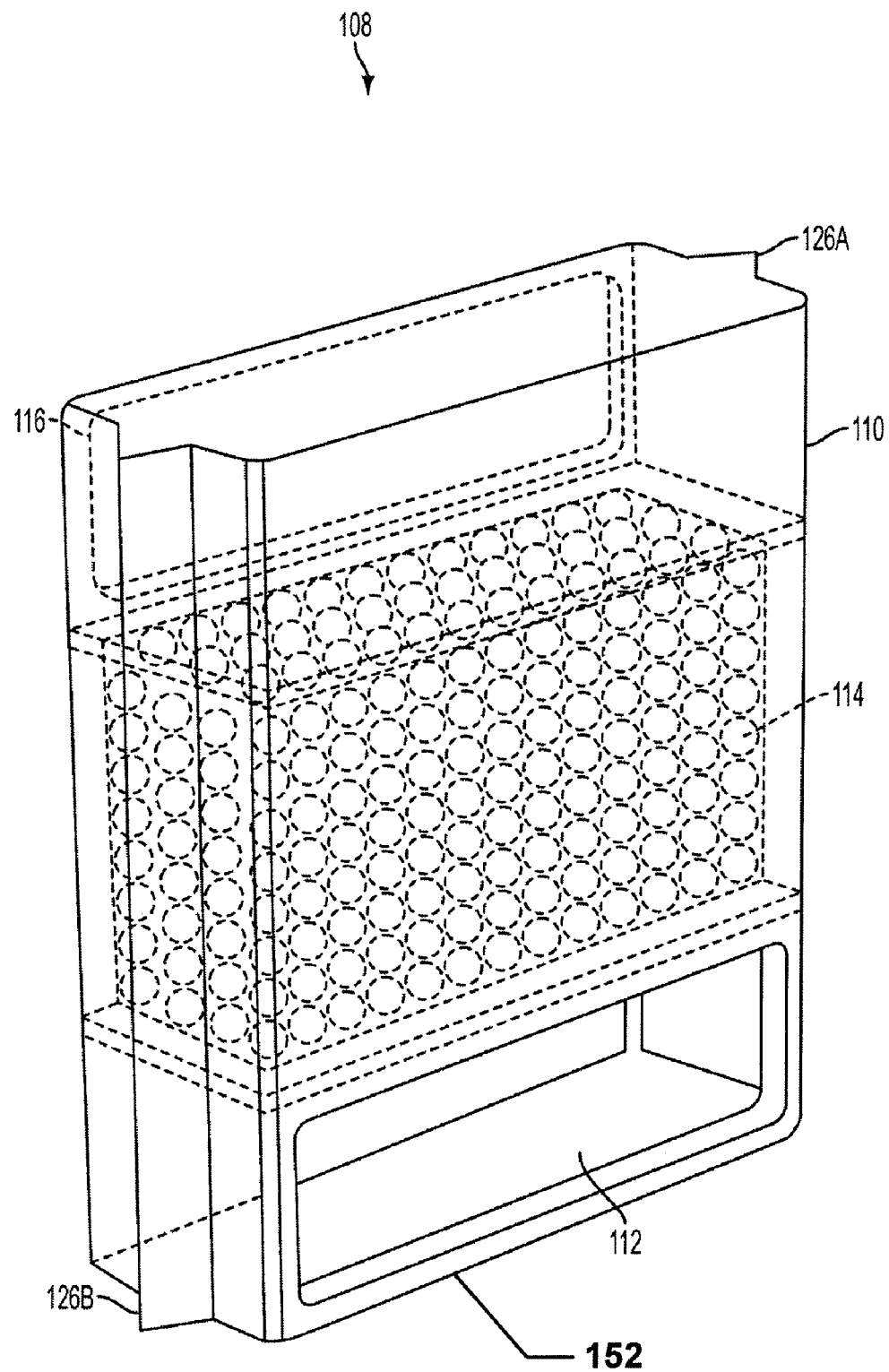
FIG. 4 illustrates a rear perspective view of an example aquarium filter cartridge according to embodiments of the present invention for use in the aquarium filtration system of FIG. 1.
Figure 5:
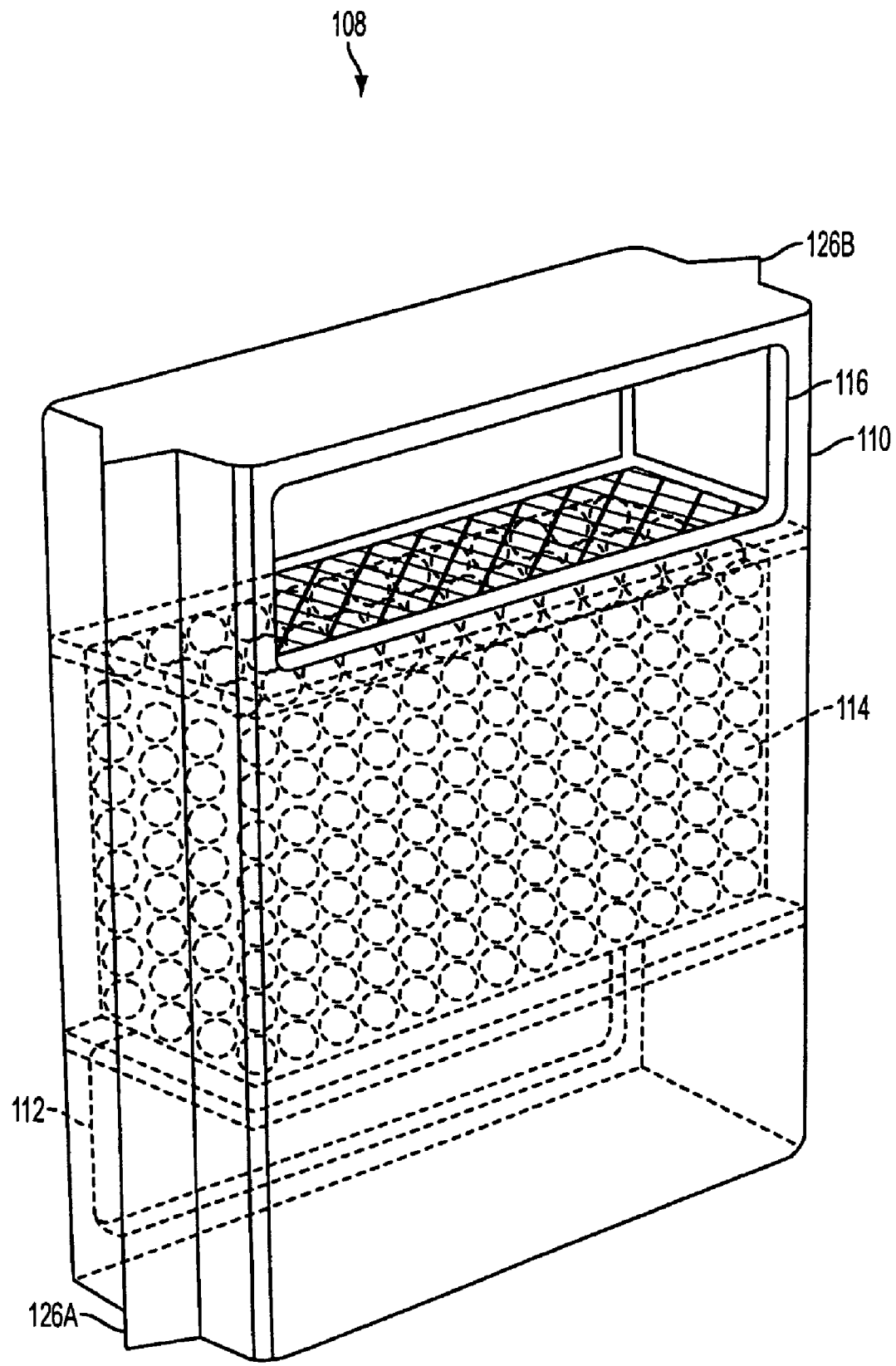
FIG. 5 illustrates a front perspective view of an example aquarium filter cartridge according to embodiments of the present invention for use in the aquarium filtration system of FIG. 1.

FIGS. 4 and 5 illustrate rear and front perspective views, respectively, of an example aquarium filter cartridge 108 according to embodiments of the present invention. As indicated above, the cartridge 108 may include a rectangular, preferably plastic, container or housing 110. Inside the housing 110, a filtration material or medium 114 such as activated carbon, zeolite, thermoplastic tubules or other materials is held. In some embodiments, the filtration medium 114 may be held in prepackaged netting or mesh webbing. Alternatively, the housing 110 may include grates or grills that swing open to allow bulk material to be poured into the housing 110.

The cartridge housing 110 is closed except for an entrance and an exit. A water entrance 112 is disposed along the bottom of the cartridge housing and is approximately 0.5 to 1.5 inches high to allow ingress of water on the side of cartridge 108 away from the aquarium. The entrance is designed to have a lowermost portion that it is substantially disposed at the bottom of canister 104 so that the water exerts a maximum water pressure to aid in the flow of the water through the filter medium. Furthermore, having a lowermost portion of the entrance disposed substantially at the bottom of the canister avoids having deadspot pools. In such deadspots, some water accumulates in front of a large lip portion without flowing through the filter, while other water that has more recently been filtered by the panel screening filter 106 flows over the pool and enters the cartridge for filtration.

An exit 116 is disposed at the top of the cartridge 108. Preferably it has a dimension between 0.5 to 1.5 inches high to allow egress of water out onto the spillway 118 (FIG. 1) or directly back into the fish tank. Exit 116 has a lowermost portion that is disposed to be substantially level with the top of spillway 118 so that water that has been filtered can easily exit. The particular height of the lowermost portion of the exit permits the water to flow most easily through cartridge 108 and through canister 104. Since the height that the water must be pumped is level with the spillway, no excess capacity needs to be required by the filtration pump. Accordingly, a smaller pump may be used and/or less power is consumed by the pump.

In some embodiments, the filtration medium 114 may be contained in the housing between the bottom of the upper entrance 116 and the top of the lower entrance 112 as shown in FIGS. 4 and 5. In other embodiments, the filtration medium 114 may extend above and/or below these points.

In some embodiments, the housing 110 may include hinges to allow the housing 110 to be opened to replace the filtration medium 114 and/or clean the housing. In alternative embodiments, the housing may be designed to come apart and snap back together using pressure fittings. In yet other embodiments, the top, bottom, and/or sides of the housing 110 may include doors that can be opened to provide access to the filtration material 114. In some embodiments, the entrance 112 and exit 116 may be dimensioned to allow replacement of the filtration medium 114. In such embodiments, the housing may include a through pin or releasable catch to support the filtration medium 114.

In an alternative embodiment of the filtration assembly 100, the panel screening filter 106 (FIG. 1) may include both floss filter material and charcoal material. In such embodiments a plurality of thermoplastic tubules may be disposed in the housing 110. Alternatively, thermoplastic tubules may be disposed with floss filter material on the panel screening filter 106 and charcoal material may be disposed in the housing 110.

Figure 6:
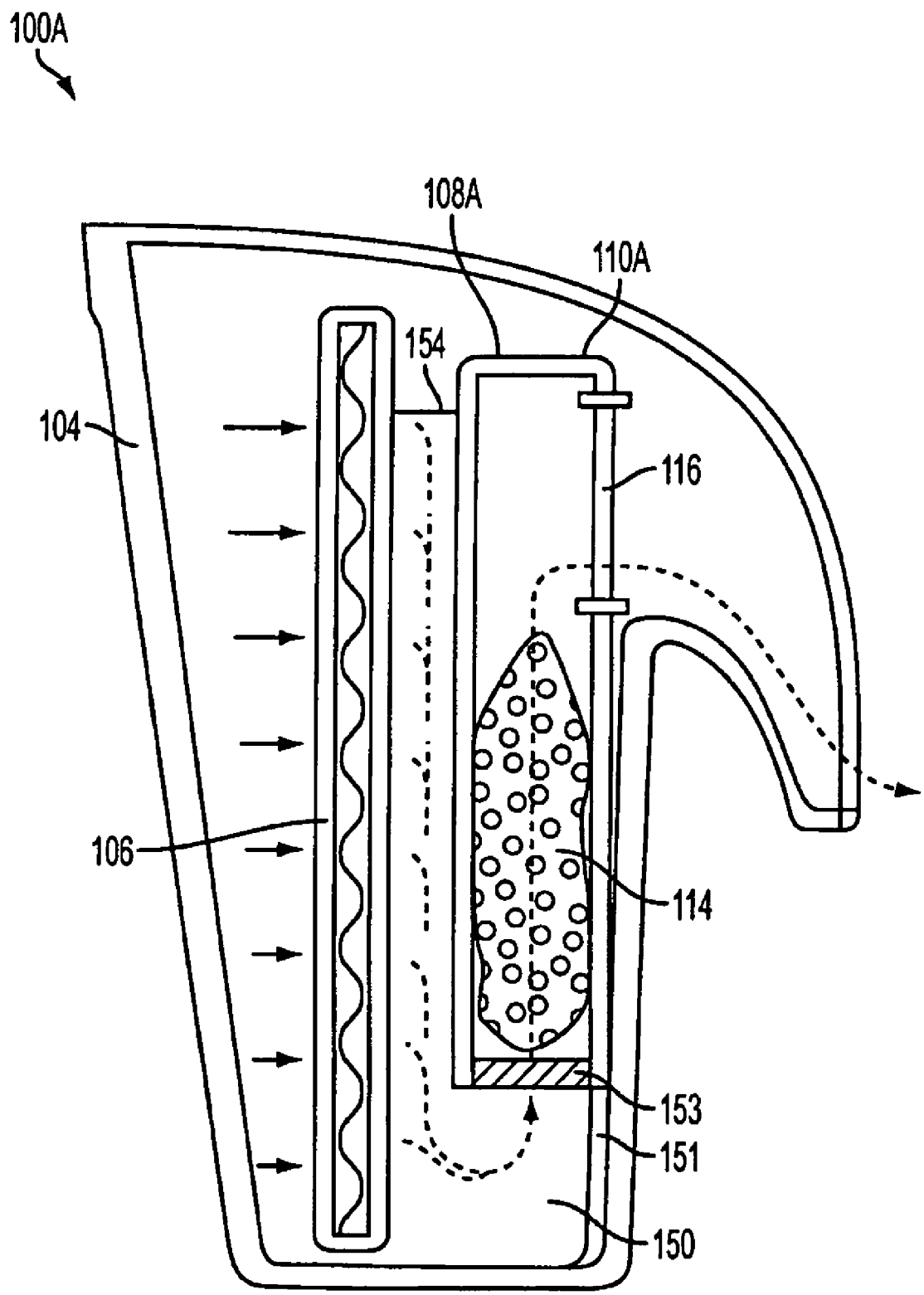
FIGS. 6, 7, and 8 illustrate a side plan views of a further embodiments of an aquarium filtration systems.
Figure 7:
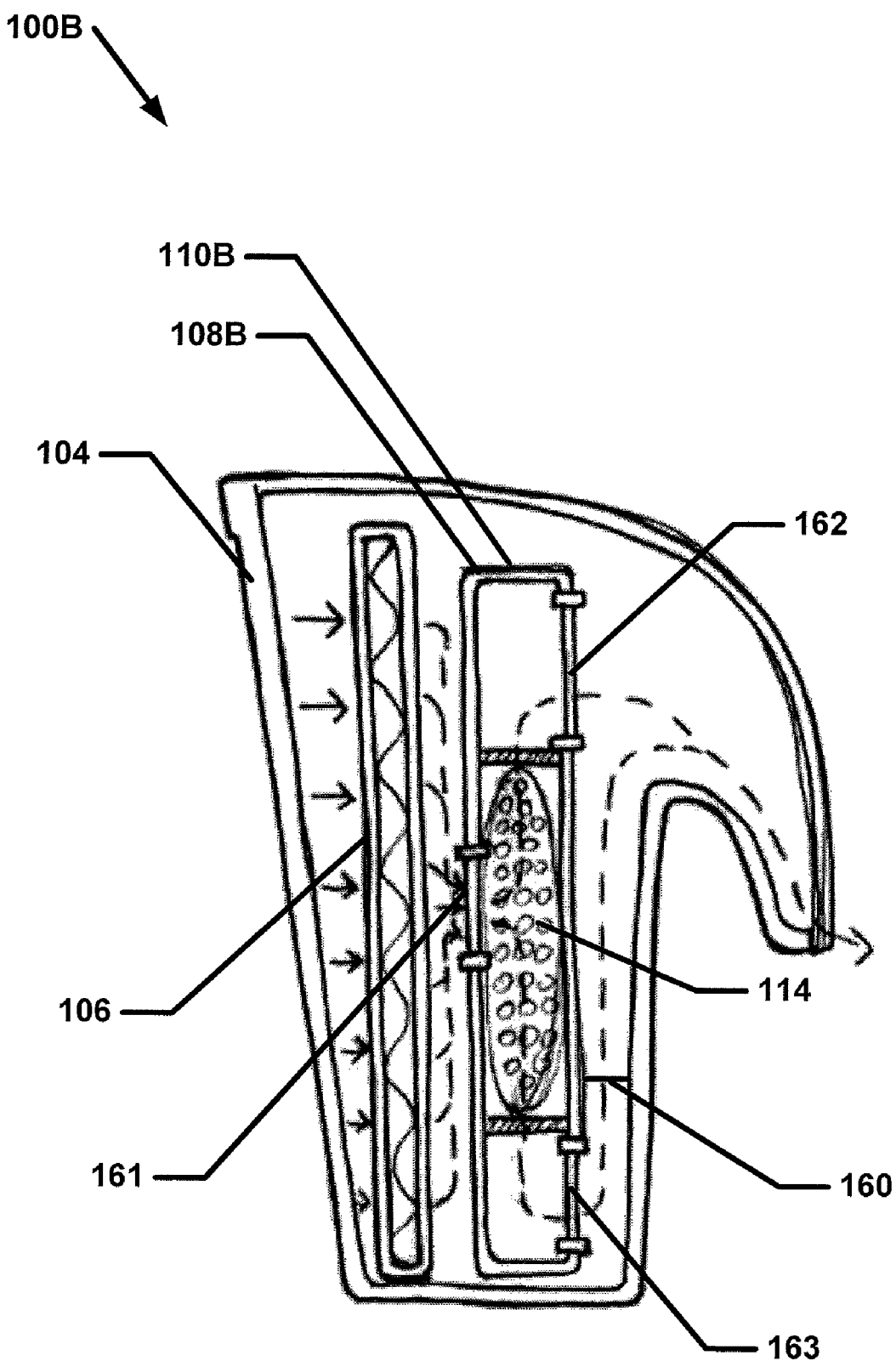
Figure 8:
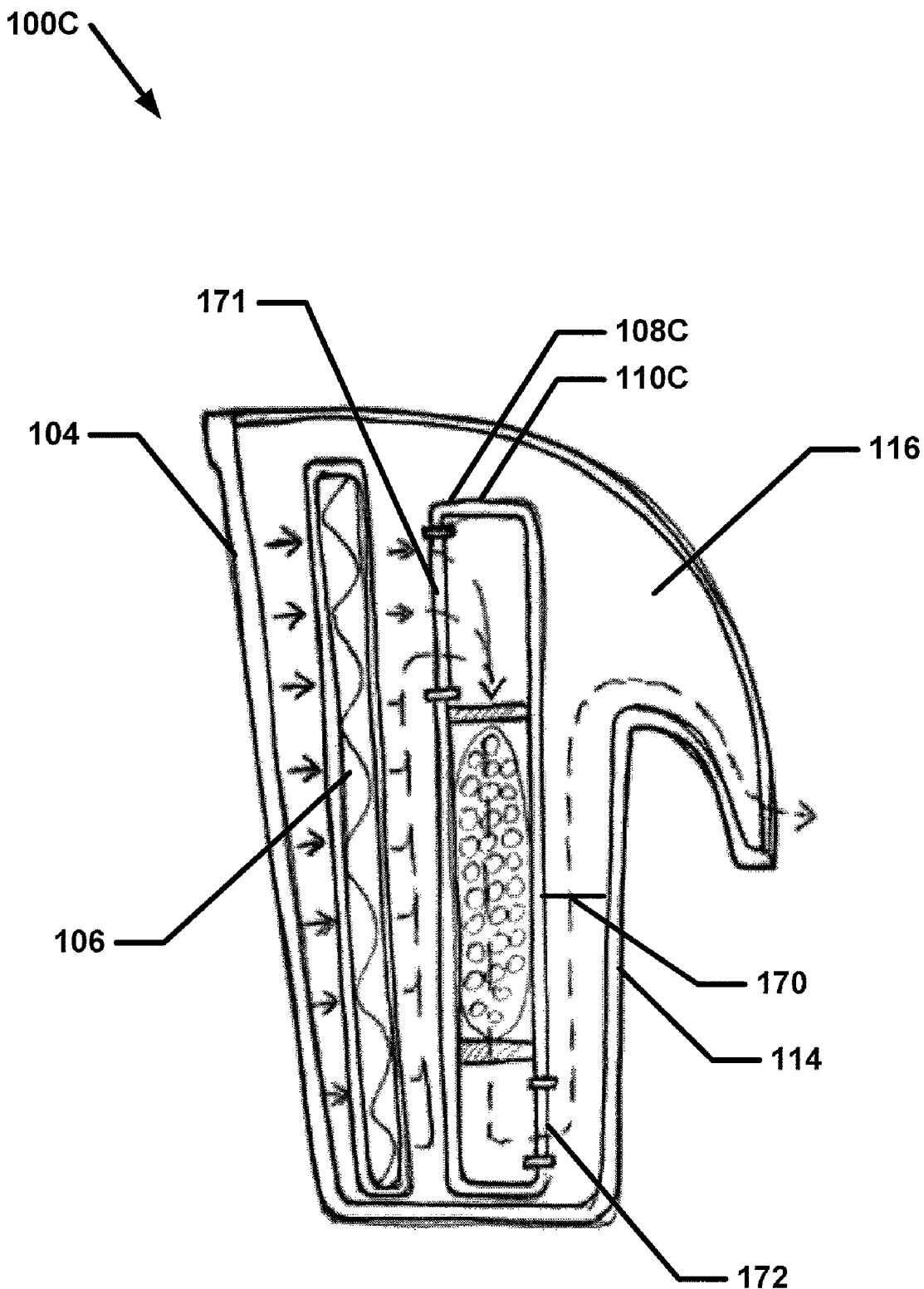

FIGS. 6, 7, and 8 illustrate further embodiments of a filtration assembly of the present invention having water flow paths that are distinct from those described previously herein. With reference to FIG. 6, a filtration assembly 100A is disposed in canister 104 and comprises panel screening filter 106 and filter cartridge 108A having a rectangular, preferably plastic, housing 110A. Inside the housing 110A, filtration material or medium 114, as described above, is held in a prepackaged netting or mesh webbing or is placed loosely in the cartridge.

In the present example, the cartridge is sized to be relatively short to permit the cartridge to be spaced apart from the bottom of canister 104 and create a space 150. To achieve this, cartridge 108A may be suitably held in place by features of canister 104 that act to retain the cartridge via it's top or side. Alternatively or in addition thereto, the cartridge 108A may be disposed to rest on a ledge 151 suitably integrated with or added to the canister 104.

In use, water flows through an upside down L shaped flow path. The water flows through panel screen 106 and then is blocked and redirected by housing 110A toward space 150. Since space 150 is disposed in a corner of canister 104, the water is directed to a bottom portion 152 of cartridge 108A. The bottom portion 152 may be covered by a grill 153 or the like that prevents filter material or medium 114 from exiting the cartridge and which may also serve to removable or adjustable so to remove used or inoperative filter material or medium 104 and refill the cartridge 108A with new filter material or medium 114.

The water then proceeds lengthwise through filter material 114. Because this path is lengthwise through the filter material rather than across the filter material, the water enjoys a longer dwell time and consequently better filtration before exiting through exit 116, the bottom portion of which is disposed substantially level with the canister's spillway.

In variations of this embodiment it should be appreciated that the gap 154 between the filter panel and housing 110A may be adjusted by several factors: the width of the cartridge 108A, placement of the cartridge 108A relative the panel filter 106, and adjustment of the width of ledge 151. Thus in one further embodiment by narrowing the gap 154 and widening cartridge 108A, a fast water flow is achieved through the panel filter. The water then enters the space 150 wherein it is slowed and from which a slow water flow meanders through filter material 114, i.e. cartridge 108A, permitting water to achieve better filtration.

With reference to FIG. 7, a filtration assembly 100B is disposed in canister 104 and comprises panel screening filter 106 and filter cartridge 108B having a rectangular, preferably plastic, housing 110B which is spaced from the forward edge of canister 104 by a gap 160. Inside the housing 110B, filtration material or medium 114, as described above, is held in a prepackaged netting or mesh webbing or is placed loosely in the cartridge.

In use, water being filtered creates a front feed path wherein the water flows through panel screen 106 and then is blocked and redirected by housing 110A toward entrance 161 located on the side of housing 110B closest to the panel filter. Preferably, entrance 161 is located approximately at the center of the front of the housing and may be rectangular opening along the housing length or a circular opening disposed at the housing's front side at the center. The water path divides into two paths to traverse the length of the filter medium between the entrance 161 and exits 162 and 163, which are located at preferably but necessarily the opposite housing wall and a relative top and bottom portion, respectively. This path also significantly increases dwell time over a path that is across the filtration material.

Exit 162 may be disposed substantially level with the canister's spillway or level with the spill way while exit 163 is disposed below the spillway and the water exiting at exit 163 needs to flow up along the side of canister 104 and exit the spillway.

The water then proceeds lengthwise through filter material 114. Because this path is lengthwise through the filter material rather than across the filter material, the water enjoys a longer dwell time and consequently better filtration before exiting through exit 116, the bottom portion of which is disposed substantially level with the canister's spillway.

With reference to FIG. 8, a filtration assembly 100C is disposed in canister 104 and comprises panel screening filter 106 and filter cartridge 108C having a rectangular, preferably plastic, housing 110C which is spaced from the forward edge of canister 104 by a gap 170. Inside the housing 110C, filtration material or medium 114, as described above, is held in a prepackaged netting or mesh webbing or is placed loosely in the cartridge.

In use, water being filtered creates a backwards S path wherein the water flows through panel screen 106 and then is blocked and redirected by housing 110A toward entrance 171 located on the side of housing 110C closest to the panel filter. Preferably, entrance 171 is located approximately at the top of the front of the housing and may be rectangular opening along the housing length or a circular opening disposed at the housing's front side at the center. The water then traverses the length of the filter medium to exit at exit 172, which is located at preferably but necessarily the opposite housing wall and a bottom portion of the housing. This path also significantly increases dwell time over a path that is across the filtration material.

Exit 172 and entrance 171 may be sized so that one is larger than the other. For example, it may be advantageous to have entrance 171 be larger than the exit 172 since water pressure will assist the flow of water from exit 172. Thus, by varying the size a flow pressure may be created that is ideal for the canister and or for the aquarium. After exiting from exit 172 flows up along the side of canister 104 and exits the spillway.

FIG. 9a is a perspective view of an aquarium filtration system in accordance with one or more embodiments of the present invention. FIG. 9b is a cross-sectional view of the aquarium filtration system of FIG. 9a. System 200, i.e., assembly 200, may be configured substantially similar to system 100, i.e., assembly 100. However, preferably, system 200 is configured substantially as described below, wherein the water path is configured to comprise a S-shape. System 200 includes a water intake chamber 102 that receives unfiltered aquarium water from a pump (e.g., an impeller) (not shown). The water intake chamber 102 is in fluid communication with a canister 104 that is adapted to laterally support a removable panel screening filter 106 and a removable filter cartridge 208. After passing through the panel screening filter 106, water enters the filter cartridge 208 passes through one or more filtration media 114, and exits the filter cartridge and is then returned to the aquarium via a spillway 118.

As mentioned above, the advantage of the S-shaped water path is that it is longer than the water paths known in the art. The present invention advantageously increases the amount of "dwell time" the water is in contact with the filtration media 114 and at the same time provides a convenient disposable cartridge-based filter that is easy to access, replace, and/or clean. It is an additional advantage of the present invention that biological filtration is greatly facilitated by a longer water path with greater dwell time. It is a further advantage that the cartridge comprises an entrance and an exit situated to take maximum advantage of fluid dynamics present in the canister so as to optimize the filtration pump and/or power being consumed.

Figure 10C:
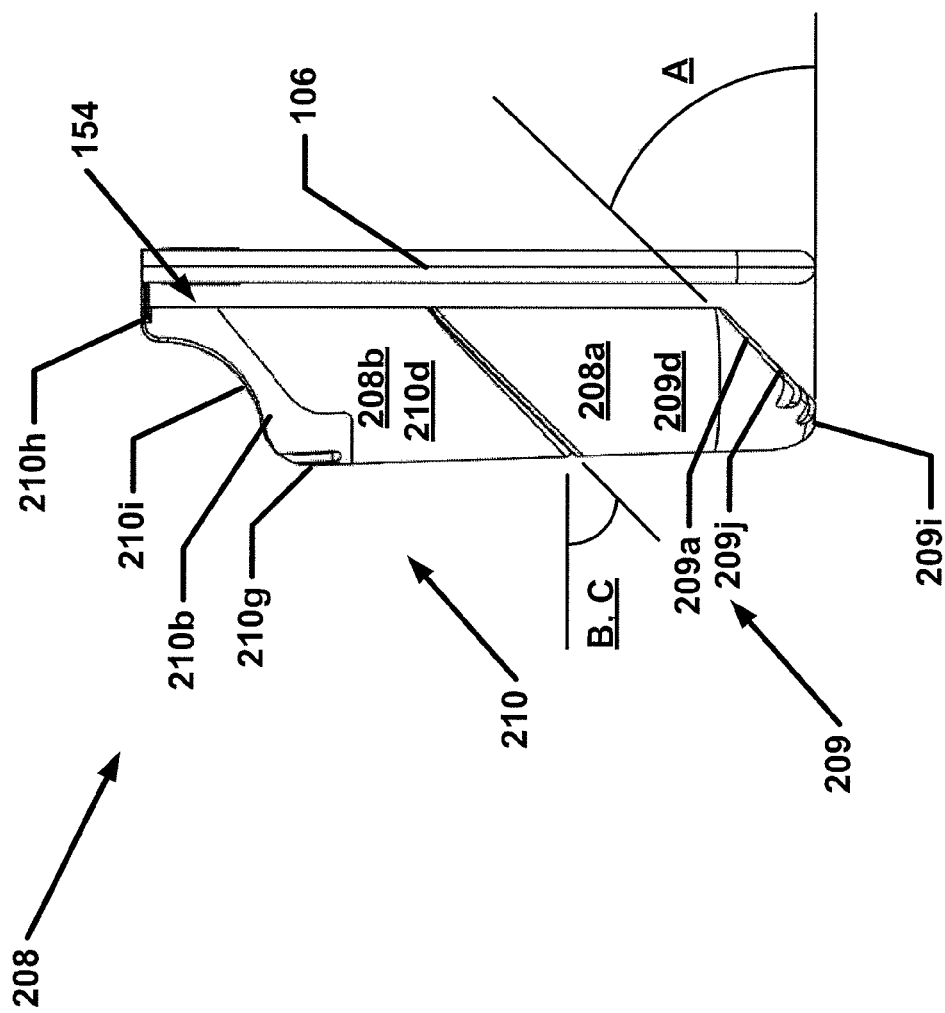
FIG. 10c is a side view of the filter cartridge of FIGS. 10a and 10b.

FIGS. 10a and 10b are perspective views of a filter cartridge in accordance with one or more embodiments of the present invention. FIG. 10c is a side view of the filter cartridge of FIGS. 10a and 10b. FIGS. 10d and 10e are perspective views of the filter cartridge of FIGS. 10a and 10b, wherein the filter cartridge is shown in a separated status.

A filter cartridge 208 may be disposed in a canister 204 to be operable with a panel screening filter 106 to filter water from an aquarium. Canister 204 may be comprised substantially identical to canister 104, but may also include certain differences as described below.

Cartridge 208 may be made to comprise a unitary body, but may also comprise one or more cartridge units that are placed together to form a cartridge 208. These units may be arranged in any convenient way—adjacent longitudinally, stacked—though each arrangement offers unique advantages from the others. One advantage of having separate cartridge units are that as one type of filtration media 114 is used it can be replaced without the need for the replacement of the other. For example, filtration media comprising porous tubules may be used much before carbon filtration media is used and, thus, the porous tubules may be positioned in a cartridge unit that is easily reached such as a top-most cartridge unit. To stabilize the units the meet at walls that are angles. In accordance with one embodiment of the present invention, the units may comprise a releasable locking mechanism to join one or more units together.

For example, the units may be arranged adjacent to each other longitudinally, i.e., along an axis substantially perpendicular to the water surface in the aquarium. The water enters a first cartridge unit at an entrance in a wall that is proximate to the panel screening filter 106. The to-be-filtered water passes through the length of the cartridge filter and exits by an exit in a sidewall. Then, the water enters a subsequent, i.e., second, cartridge unit through an entrance disposed substantially directly opposite the exit in the first cartridge unit. The water passes through the second cartridge unit and exits at an exit. The exit may be disposed in a sidewall of the second cartridge unit or exit a front wall of the second cartridge unit such that it exits to the aquarium as described above.

However, filter cartridge 208 includes one or more cartridge units that preferably stacked upon each other such that water enters the first unit passes the length of the unit and enters a subsequent second unit. The water may then enter a further unit or pass into the aquarium.

For example, cartridge 208 includes a first cartridge unit 208a and a second cartridge unit 208b. Each cartridge unit is configured to comprise a respective housing defining an inner space that is adapted to removable hold at least one filtration medium 114 and permit easy replacement of the medium. The medium may be disposed in a container, such as a mesh bag, or may be provided loose in the inner space. Thereto, each cartridge unit 208a and 208b may comprise grates or grills that swing open to allow filling of the filtration medium.

The cartridge comprises an entrance 212a for admitting panel-screened water and an exit 212b that returns cleaned-filtered water to the aquarium. The entrance and exit are disposed on spaced-apart walls each of which is provided on preferably a different cartridge unit.

Cartridge unit 208a comprises a housing 209 that may be made of any durable material, such as plastic. The housing comprises a pair of spaced-apart walls that include a first wall 209a having an entrance 212a for admitting panel-screened water to the cartridge unit and a second wall 209b having an exit 212c, that may be configured as an intermediate access, for passing at least partially filtered water to a subsequent cartridge unit 208b or into the aquarium tank after being filtered by media 114.

The first and second walls are connected by a pair of sidewalls 209c, 209d that are preferably formed to have a curvilinear cross-section such that they fit easily into respective support grooves 122a provided in canister 204.

The first and second walls are also connected by a pair of preferably spaced-apart upright wall that include a third wall 209e proximate to the panel screening filter 106 and a fourth wall 209f proximate to the spillway. Wall 209f may comprise one or more indentations 209g that cooperate with a mating section 204a that serve to verify the correct orientation of cartridge unit 208a in canister 204 as well as prevent errant dislocation of the cartridge unit in the canister. To permit easy insertion of the cartridge unit, unit 208a may comprise rounded corners 209h.

In accordance with one or more embodiments, first wall 209a comprises a grill 214a, which may be configured as grill 153, or the like that prevents filter material or medium 114 from exiting the cartridge unit and which may also be used to remove or adjust the filter medium.

First wall 209a may comprise an angle A with respect to a flat bottom. In other words, first wall 209a may comprise an angle A other than a 90 degree angle with respect to walls 209e and 209f and/or with respect to the plane of the surface of the water in the aquarium to permit easier entry of water from the screening panel 106.

However, wall 209a may also comprise a flat portion 209i and an angled portion 209j, which may comprise an angle other than a 90 degree angle with respect to walls 209e and 209f and/or with respect to the plane of the surface of the water in the aquarium to permit easier entry of water from the screening panel 106. The flat portion may act as a stand for the cartridge unit and subsequent units stacked on top of the present unit. In addition thereto, or instead of, the flat portion acts as a barrier to the movement of the water to pass in front of the cartridge 208 and escape filtration. The flat portion may be substantially smaller than the angled portion to permit the maximum possible amount of panel-screened water to enter cartridge unit 208a via entrance 212a.

In accordance with one or more embodiments, second wall 209b comprises a grill 214b, which may be configured as grill 153, or the like that prevents filter material or medium 114 from exiting the cartridge unit and which may also be used to remove or adjust the filter medium.

Second wall 209b may comprise an angle B with respect to walls 209e and 209f and/or with respect to the plane of the surface of the water in the aquarium to permit subsequent cartridge units, such as cartridge unit 208b, to resist errant dislocation of the subsequent cartridge unit. Moreover, preferably, second wall 209b is substantially parallel to first wall 209a, thus, the distance between substantially all positions at entrance 212a are equidistant from respective positions at exit 212c such that the water that passes through the cartridge unit has a uniform travel length such that the water preferably is filtered similarly.

Grill 214b may comprise larger openings than grill 214a. Since it passes water to a subsequent cartridge unit, larger openings in grill 214b reduce hydrodynamic drag from structures obstruction the flow.

Preferably, second wall 209b may be opened or is removable from the remainder of the housing to permit access to the interior space for removal of used filtering medium 114, adjustment of existing filtering medium, or replacement/insertion of new medium. Therein, second wall 209b may comprise one or more hinges, snap fits, and/or stanchions or poles received in receivers in the remainder of the housing.

Cartridge unit 208b comprises a housing 210 that may be made of any durable material, such as plastic. The housing comprises a pair of spaced-apart walls that include a first wall 210a having an entrance 212d, that may be configured as an intermediate access, for admitting at least partially filtered water from cartridge unit 208a to cartridge unit 208b and a second wall 210b having an exit 212b for passing fully filtered water into the aquarium tank after being filtered by media 114 in cartridge unit 208b.

The first and second walls are connected by a pair of sidewalls 210c, 210d that are preferably formed to have a curvilinear cross-section such that they fit easily into respective support grooves 122a provided in canister 204 and also preferably match the cross-section of the sidewalls cartridge unit 208a.

Preferably, cartridge 208b slides in grooves 122a and is inserted into canister 204 after cartridge 208a is inserted. Thus, the first wall of cartridge unit 208b will be opposite the second wall of cartridge unit 208a and receive at least partially filtered water.

The first and second walls are also connected by a pair of preferably spaced-apart upright wall that include a third wall 210e proximate to the panel screening filter 106 and a fourth wall 210f proximate to the spillway.

In accordance with one or more embodiments, first wall 210a comprises a grill 214c that preferably cooperates with grill 214b so as to reduce hydrodynamic resistance to water flow. Grill 214c may be configured as grill 153, or the like that prevents filter material or medium 114 from exiting the cartridge unit and which may also be used to remove or adjust the filter medium.

First wall 210a may comprise an angle C, that is substantially similar to angle B, with respect to walls 210e and 210f and/or with respect to the plane of the surface of the water in the aquarium to permit easier entry of water from the screening panel 106. Preferably, wall 210a comprises an angle that matches the angle of wall 209b to provide a fit without play. Cartridge unit 208a and 208b may comprise a locking assembly or other means for joining together. For example, the units may comprise a snap fit assembly that locks walls 210a and 209b together until a force is applied to remove unit 208b.

Second wall 210b may be configured to comprise a stepped shape that includes first and second flat portion 210g, 210h, and a transition portion 210i. First flat portion 210g preferably comprises a grill 214d that is configured as exit 212b. The grill may be substantially similar to grill 153, but may also be different. The bottom of the grill preferably is disposed at the same level as the of the spillway and serves to provide easy exit of the filtered water from cartridge 208.

Second flat portion 210h preferably is configured to meet a top edge of the panel screen filter to sealingly bridge gap 154 between the cartridge and the panel screen filter and to resist movement of only panel screened water potentially into the aquarium. The transition portion may be configured to deflect filtered water into the aquarium.

Preferably, second wall 210b may be opened or is removable from the remainder of the housing to permit access to the interior space for removal of used filtering medium 114, adjustment of existing filtering medium, or replacement/insertion of new medium. Therein, second wall 210b may comprise one or more hinges, snap fits 211, and/or stanchions or poles received in receivers in the remainder of the housing.

In accordance with one or more embodiments of the present invention, wall 210b may be formed substantially as a cap, and, thus, include a side and rearward portion 210k.

Embodiments of the inventive filter cartridge and filtration system have been described here for illustration purposes only. Neither the specific embodiments of the invention as a whole, nor those of its features limit the general principles underlying the invention. In particular, the invention is not limited to any particular size or shape of the filter cartridge or of the filtration system, thickness of the filter cartridge walls or the filtration system walls, rate of water flow, means of moving water, etc. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and it is not intended that the invention should be limited to any such embodiments, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A removable filter cartridge for cleaning aquarium water in an external-type aquarium filter system having a canister and a spillway, the filter cartridge comprising:
    a first cartridge unit and a second cartridge unit, the first and second cartridge units in fluid communication with each other to pass aquarium water through filtration media disposed in each unit;
    the first cartridge unit comprising a first wall comprising a cartridge entrance and a second wall comprising an intermediate exit;
    the second cartridge unit comprising a first wall comprising an intermediate entrance and a second wall comprising a cartridge exit;
    wherein the respective first and second walls of each cartridge unit are spaced-apart; and
    wherein the water follows a substantially S-shaped path between entering the filter cartridge from the canister at the cartridge entrance and exiting the filter cartridge to the spillway at the cartridge exit.

2. The filter cartridge of claim 1, wherein the cartridge entrance and the cartridge exit are disposed on walls that are spaced-apart.

3. The filter cartridge of claim 1, wherein the first and second wall of the first cartridge unit are angled with respect to at least one adjacent wall of the first cartridge unit.

4. The filter cartridge of claim 1, wherein the first and second wall of the second cartridge unit are angled with respect to at least one adjacent wall of the second cartridge unit.

5. The filter cartridge of claim 1, wherein the second wall of the second cartridge unit comprises a flat portion for sealingly bridging the gap with a panel screen filter.

6. The filter cartridge of claim 1, wherein the second wall of the second cartridge unit comprise a cap.

7. The filter cartridge of claim 1, wherein the first and second cartridge units are stacked on each other to provide easy access to at least one unit without removing a second unit from the canister.

8. The filter cartridge of claim 1, wherein each entrance and each exit comprise a grid.

* * * * *